Patented May 29, 1928.

1,671,590

UNITED STATES PATENT OFFICE.

CORNELIUS H. KELLER, OF SAN FRANCISCO, CALIFORNIA, ASSIGNOR TO MINERALS SEPARATION NORTH AMERICAN CORPORATION, OF NEW YORK, N. Y., A CORPORATION OF MARYLAND.

FROTH-FLOTATION CONCENTRATION OF ORES.

No Drawing.   Application filed March 24, 1927.   Serial No. 178,145.

This invention relates to ore concentration. According to this invention the froth-flotation concentration of ores is carried out by the aid of alkaline-earth metal xanthates or of impure xanthates carrying more or less of an alkaline-earth metal xanthate. The invention is well adapted to be used where xanthates are locally produced at mines, and is herein disclosed as carried out with the use of calcium and barium xanthates. These xanthates are especially useful in concentrating iron-bearing ores, where it is desired to obtain a product low in iron.

An impure calcium xanthate was made by agitating together for a half hour twenty grams of calcium oxide, seventy-five grams of water, ten cubic centimeters of carbon disulphide, and fifteen cubic centimeters of alcohol. This was successfully used about a week later in the froth-flotation concentration of Anaconda ore in neutral circuit.

Another freshly prepared lot of this impure xanthate was used in the following test on Utah Copper Company ore. The ore was reground for fifteen minutes with six pounds of calcium oxide per ton to pass 80 mesh, made into a pulp with water, and then agitated for ten minutes with 0.2 pounds of steam distilled pine oil and 0.6 pounds of the foregoing impure xanthate, both per ton of ore, and a froth concentrate separated. The results are shown in the following table:

|  | Wt. | Assays | | Recoveries | |
| --- | --- | --- | --- | --- | --- |
|  |  | Cu. | Fe. | Cu. | Fe. |
|  | Per cent | Per cent | Per cent | Per cent | Per cent |
| Heads | 100.5 | 0.83 | 3.7 |  |  |
| Conc | 7.8 | 9.04 | 23.0 | 84.5 | 48.1 |
| Tails | 92.2 | .14 | 2.1 | 15.5 | 51.9 |

An impure xanthate was made by reaction between sodium carbonate, water, lime, carbon disulphide and alcohol to contain about 5% each of calcium xanthate and calcium thiocarbonate, and some sodium xanthate, and was used in the following test on Utah Copper Company ore. The ore was reground for fifteen minutes with six pounds of calcium oxide per ton, made into a pulp with water, and then agitated for ten minutes with 0.2 pounds of steam distilled pine oil and 0.45 pounds of the foregoing impure xanthate, both per ton of ore, and a froth concentrate separated. The results are shown in the following table:

|  | Wt. | Assays | | Recoveries | |
| --- | --- | --- | --- | --- | --- |
|  |  | Cu. | Fe. | Cu. | Fe. |
|  | Per cent | Per cent | Per cent | Per cent | Per cent |
| Heads | 100.0 | 0.94 | 3.7 |  |  |
| Conc | 7.3 | 10.04 | 23.5 | 78.2 | 46.8 |
| Tails | 92.7 | .22 | 2.1 | 21.8 | 53.2 |

Another impure xanthate mixture was made like the last-described, but by a mixture so modified as to yield a product containing about 25% each of calcium xanthate and calcium thiocarbonate, and some sodium xanthate and sodium thiocarbonate, and was used in the following test on Comstock silver ore.

The ore was reground to pass 120 mesh, made into a pulp with water, and then agitated for fifteen minutes with 0.4 pounds of Barret #2 coal tar creosote, 0.4 pounds of cresylic acid, and 0.15 pounds of the impure xanthate mixture, all per ton of ore, to yield a lead-bearing froth concentrate. The remaining pulp was then further agitated with the further addition of 1 pound of copper sulphate, four pounds of calcium oxide, 0.4 pounds water gas tar, 0.2 pounds steam distilled pine oil, and 0.25 pounds of the same xanthate mixture, all per ton of ore, to yield a zinc-bearing froth concentrate.

The lead concentrate was then further agitated for ten minutes with the further addition of one pound of sodium cyanide and 0.2 pounds cresylic acid, both per ton of original ore, to yield a finished lead concentrate and a lead middling. The zinc concentrate was further agitated for ten minutes with the further addition of 0.1 pound per ton of original ore of the same xanthate mixture to yield a finished zinc concentrate and a zinc middling. The results are shown in the following table:

|  | Wt. | Assays | | | | |
|---|---|---|---|---|---|---|
|  |  | Au. | Ag. | Pb. | Zn. | Fe. |
|  | Per cent | Oz. per ton | Oz. per ton | Per cent | Per cent | Per cent |
| Heads | 100.0 | 0.10 | 7.56 | 8.9 | 9.7 | 3.3 |
| Conc. Pb | 9.4 | .30 | 38.7 | 76.4 | 5.6 | 1.6 |
| Midd. Pb | 2.5 | 1.06 | 87.34 | 49.5 | 15.5 | 3.0 |
| Conc. Zn | 15.1 | .21 | 6.39 | .8 | 51.4 | 4.8 |
| Midd. Zn | 11.0 | .05 | 2.55 | 1.8 | 5.8 | 4.1 |
| Tails | 62.0 | .01 | .79 | .2 | .7 | 3.0 |

|  | Recoveries | | | | |
|---|---|---|---|---|---|
|  | Au. | Ag. | Pb. | Zn. | Fe. |
|  | Oz. per ton | Oz. per ton | Per cent | Per cent | Per cent |
| Heads |  |  |  |  |  |
| Conc. Pb | 28.8 | 48.2 | 81.2 | 5.4 | 4.6 |
| Midd. Pb | 27.0 | 29.0 | 14.0 | 4.0 | 2.3 |
| Conc. Zn | 32.3 | 12.8 | 1.3 | 79.5 | 22.2 |
| Midd. Zn | 5.6 | 3.6 | 2.2 | 6.6 | 13.8 |
| Tails | 6.3 | 6.4 | 1.3 | 4.5 | 57.1 |

In the following examples substantially pure alkaline earth metal xanthates were used.

Utah Copper Company ore was reground for fifteen minutes with five pounds of calcium oxide per ton of ore, made into a pulp with water, and agitated for fifteen minutes with 0.25 pounds of steam distilled pine oil, and 0.15 pounds of calcium xanthate, both per ton of ore, and a froth concentrate separated. The results are shown in the following table:

|  | Wt. | Assays | Recoveries |
|---|---|---|---|
|  |  | Cu. | Cu. |
|  | Per cent | Per cent | Per cent |
| Heads | 100 | 0.94 |  |
| Conc | 10.6 | 7.96 | 89.7 |
| Tails | 89.4 | 0.11 | 10.3 |

An almost equally good result was obtained in an acid pulp. The same ore ground for fifteen minutes without reagents, was made into a pulp with water and agitated for fifteen minutes with six pounds of sulphuric acid, 0.25 pounds steam distilled pine oil, 0.3 pounds calcium xanthate, and 0.05 pounds crude pine oil, all per ton of ore, and a froth concentrate separated. The results are shown in the following table:

|  | Wt. | Assays | Recoveries |
|---|---|---|---|
|  |  | Cu. | Cu. |
|  | Per cent | Per cent | Per cent |
| Heads | 100 | 0.93 |  |
| Conc | 10.6 | 7.68 | 87.5 |
| Tails | 89.4 | 0.13 | 12.5 |

Table middlings from Doe Run mine of the Flat River district lead ore, containing blende and pyrite, were reground for ten minutes in a ball mill, made into a pulp with water, and agitated with 0.25 pounds of cresylic acid, 0.1 pounds of a saturated solution of sulphur dioxide, 0.7 pounds of coal tar creosote and 0.075 pounds of calcium xanthate, all per ton of ore, to yield a lead-froth concentrate. The remaining pulp was further agitated with the further addition of four pounds of calcium oxide, 1.5 pounds of copper sulphate, 0.3 pounds of water gas tar, 0.15 pounds of steam distilled pine oil and 0.1 pounds of calcium xanthate, all per ton of ore, to yield a zinc-froth concentrate.

The lead concentrate was further agitated with the further addition of 0.3 pounds of coal tar creosote, 0.05 pounds of calcium xanthate, and 0.3 pounds of sodium cyanide, all per ton of original ore, to yield a finished lead concentrate and a lead middling. The zinc concentrate was further agitated with the further addition of four pounds calcium oxide and 0.015 pounds of calcium xanthate, both per ton of original ore, to yield a finished zinc concentrate and a zinc middling. The results are shown in the following table:

|  | Wt. | % Wt. | Assays | | | Recoveries | | |
|---|---|---|---|---|---|---|---|---|
|  |  |  | Pb. | Zn. | Fe. | Pb. | Zn. | Fe. |
|  |  |  | Per cent | Per cent | Per cent | Per cent | Per cent | Per cent |
| Heads | 959 | 100.0 | 9.22 | 11.29 | 10.8 |  |  |  |
| Pb. Conc | 95 | 9.9 | 61.2 | 14.6 | 2.5 | 65.6 | 12.8 | 2.3 |
| Pb. Midd | 100 | 10.5 | 19.4 | 25.0 | 13.4 | 22.1 | 22.3 | 13.0 |
| Zn. Conc | 95 | 9.9 | 1.8 | 62.0 | 1.7 | 1.9 | 54.4 | 1.5 |
| Zn. Midd | 116 | 12.1 | 5.0 | 6.0 | 32.5 | 6.6 | 6.4 | 36.4 |
| Tails | 553 | 57.6 | 0.6 | 0.8 | 8.8 | 3.8 | 4.1 | 46.8 |
|  | 959 | 100.0 |  |  |  |  |  |  |

Results similar to those obtained with calcium xanthate were obtained with barium xanthate, except that in a pulp acidified with sulphuric acid the insolubility of barium sulphate seemed to interfere with the utility of a barium salt.

Utah Copper Company ore was ground in a ball mill for fifteen minutes with five pounds of calcium oxide per ton of ore, and made into a pulp with water. The pulp was then agitated for fifteen minutes with 0.25 pounds of steam distilled pine oil and 0.2 pounds of barium xanthate, both per ton of ore, and a froth concentrate separated. The results are shown in the following table:

|  | Wt. | Assays | Recoveries |
|---|---|---|---|
|  |  | Cu. | Cu. |
|  | Per cent | Per cent | Per cent |
| Heads |  | 0.89 |  |
| Conc | 9.4 | 8.44 | 88.8 |
| Tails | 90.6 | 0.11 | 11.2 |

Table middlings from Doe Run mine of the Flat River district lead ore, containing blende and pyrite, were reground in a ball mill with 0.1 pound per ton of a saturated sulphur dioxide solution, made into a pulp with water and then agitated for ten minutes with 0.25 pounds cresylic acid, 0.05 pounds of saturated sulphur dioxide solution, 0.7 pounds of coal tar creosote, and 0.15 pounds of barium xanthate, all per ton of ore, and a lead-bearing froth concentrate separated. To the remaining pulp was added four pounds of calcium oxide, 1.5 pounds of copper sulphate, 0.3 pounds of water gas tar, 0.15 pounds of steam distilled pine oil, and 0.15 pounds of barium xanthate, all per ton of ore, and a zinc-bearing froth concentrate separated.

The lead concentrate was further agitated with the further addition of 0.3 pounds of coal tar creosote, 0.05 pounds of barium xanthate, and 0.3 pounds of sodium cyanide, all per ton of original ore, to yield a finished lead concentrate and a lead middling. The zinc concentrate was further agitated with the further addition of four pounds of calcium oxide and 0.03 pounds of barium xanthate, both per ton of original ore, to yield a finished zinc concentrate and a zinc middling. The results are shown in the following table:

|  | Wt. | % Wt. | Assays | | | Recoveries | | |
|---|---|---|---|---|---|---|---|---|
|  |  |  | Pb. | Zn. | Fe. | Pb. | Zn. | Fe. |
|  |  |  | Per cent | Per cent | Per cent | Per cent | Per cent | Per cent |
| Heads | 980 | 100.0 | 9.11 | 10.9 | 10.8 |  |  |  |
| Pb. Conc | 100 | 10.2 | 60.8 | 12.4 | 4.7 | 68.2 | 11.6 | 4.5 |
| Pb. Midd | 77 | 7.8 | 21.8 | 16.7 | 19.2 | 18.7 | 12.0 | 13.9 |
| Zn. Conc | 114 | 11.6 | 2.0 | 57.6 | 3.0 | 2.5 | 61.5 | 3.3 |
| Zn. Midd | 102 | 10.5 | 5.2 | 13.7 | 23.2 | 6.0 | 13.2 | 22.6 |
| Tails | 587 | 59.9 | 0.7 | 0.3 | 10.0 | 4.6 | 1.7 | 55.7 |

Having thus described certain embodiments of the invention, what is claimed is:

1. The process of concentrating ores which consists in agitating a suitable pulp of an ore with a mineral-frothing agent and enough of a material containing a substantial proportion of an alkaline earth metal xanthate to produce by the action of both a mineral-bearing froth containing a large proportion of a mineral of the ore, and separating the froth.

2. The process of concentrating ores which consists in agitating a suitable pulp of an ore with a mineral-frothing agent and enough of a material containing a substantial proportion of calcium xanthate to produce by the action of both a mineral-bearing froth containing a large proportion of a mineral of the ore, and separating the froth.

3. The process of concentrating ores which consists in agitating a suitable pulp of an ore with a mineral-frothing agent and with an alkaline-earth metal xanthate to produce by the action of both a mineral-bearing froth containing a large proportion of a mineral of the ore, and separating the froth.

4. The process of concentrating ores which consists in agitating a suitable pulp of an ore with a mineral-frothing agent and with a calcium xanthate to produce by the action of both a mineral-bearing froth containing a large proportion of a mineral of the ore, and separating the froth.

In testimony whereof, I have affixed my signature to this specification.

CORNELIUS H. KELLER.